(12) United States Patent
Smit

(10) Patent No.: US 6,174,444 B1
(45) Date of Patent: Jan. 16, 2001

(54) REMOVAL OF POLLUTANTS FROM EFFLUENTS WITH ELECTROCHEMICAL TREATMENT

(76) Inventor: Jochemus Johannes Smit, 4 Jeppe Street, 2522 Potchefstroom Industrial (ZA)

(*) Notice: Under 35 U.S.C. 154(b), the term of this patent shall be extended for 0 days.

(21) Appl. No.: 09/182,230

(22) Filed: Oct. 30, 1998

(30) Foreign Application Priority Data

Nov. 1, 1997 (ZA) ..................................................... 97/7015

(51) Int. Cl.$^7$ ..................................................... C02F 1/58
(52) U.S. Cl. .......................... 210/709; 205/745; 210/717; 210/724; 210/748; 210/906
(58) Field of Search ................................. 205/745, 742, 205/743; 210/702, 716, 717, 724, 709, 743, 746, 748, 906, 902

(56) References Cited

U.S. PATENT DOCUMENTS

| | | | |
|---|---|---|---|
| 3,847,788 | * 11/1974 | Wallace | 204/301 |
| 4,561,948 | 12/1985 | Stiller | 204/129 |
| 4,749,457 | * 6/1988 | Yasuda et al. | 204/150 |
| 5,630,934 | 5/1997 | Chesworth et al. | 205/742 |
| 5,698,107 | 12/1997 | Wurzburger et al. | 210/695 |
| 5,868,941 | * 2/1999 | Gillham et al. | 210/747 |

FOREIGN PATENT DOCUMENTS

95/10009    8/1994 (ZA).

OTHER PUBLICATIONS

Electroprecipitation Treatment of Acid Mine Wastewater; Dennis Jenke et al.; Water Research vol. 18, No. 7, pp. 855–859, 1984.

The amelioration of acid mine drainage by an in situ electrochemical method; part 2: employing aluminium and zinc as sacrificial anodes; SHELP et al.; Applied Geochemistry, vol. 11, pp. 425–432, 1996.

* cited by examiner

*Primary Examiner*—Peter A. Hruskoci
(74) *Attorney, Agent, or Firm*—Arent Fox Kinter Plotkin & Kahn, PLLC

(57) ABSTRACT

A method of treating an effluent such as acid mine drainage wherein the pH of the effluent is increased by dissolving metallic ions e.g. of zinc into the effluent, and the metallic ions are allowed to react with contaminants, such as sulphates or phosphates in the effluent, to form a metal-contaminant complex which is then precipitated from the effluent.

4 Claims, 3 Drawing Sheets

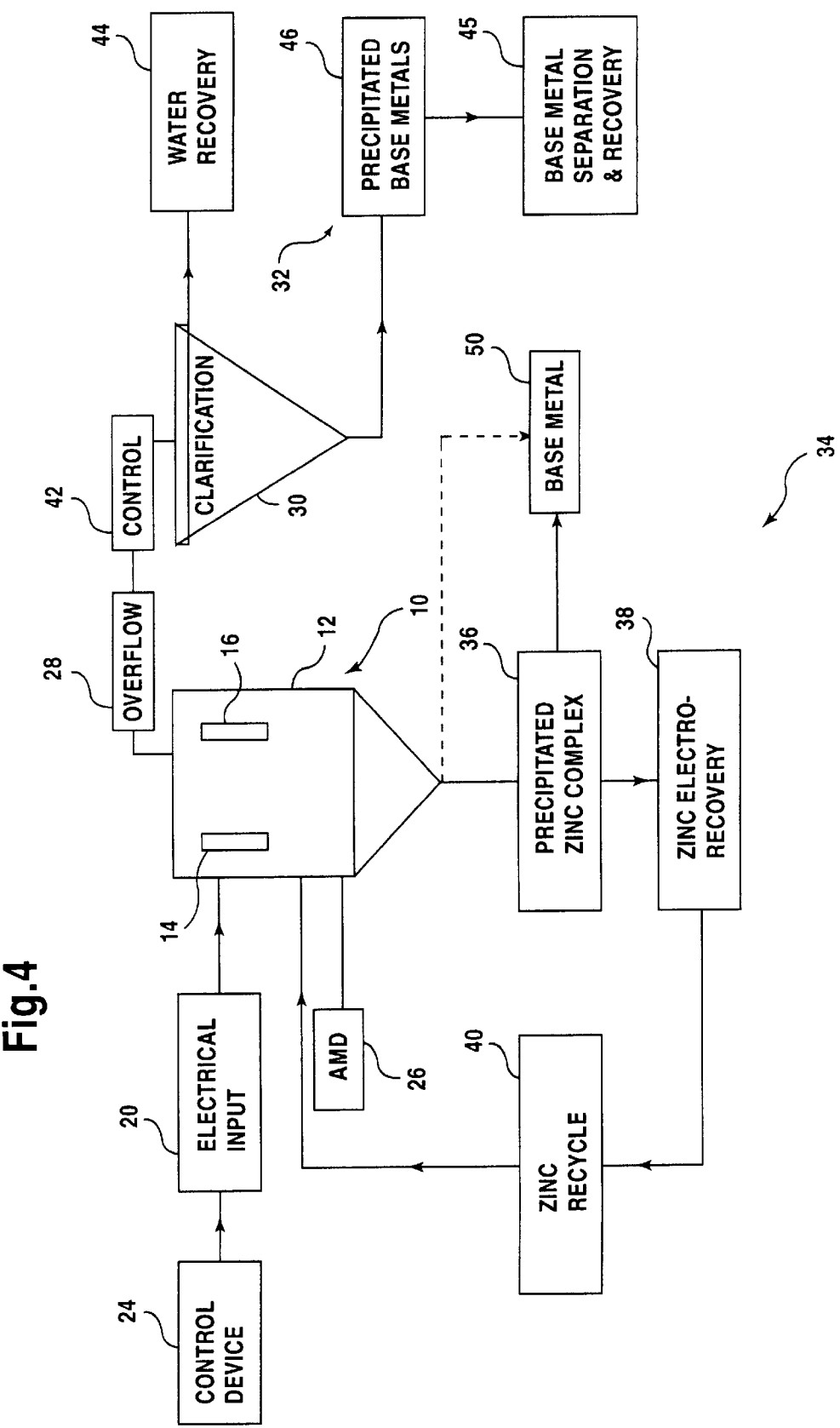

REMOVAL OF POLLUTANTS FROM EFFLUENTS WITH ELECTROCHEMICAL TREATMENT

BACKGROUND OF THE INVENTION

The invention relates generally to the treatment of an effluent and more particularly is concerned with the treatment of a waste solution such as acid mine drainage.

South African patent No. 95/10009 describes a separation process for separating solids from an electrolytic liquid stream wherein iron ions are released into the electrolyte from an iron electrode. The metal ions react with phosphate in the electrolyte and settle out as iron phosphate. Settling is enhanced by the coagulation and flocculation effect of the iron ions.

The aforementioned process is carried out while maintaining the pH of the electrolyte within the boundaries of 4 to 10.

It is not evident, from the specification of the aforementioned patent, in which way the pH of the solution is maintained in the indicated range and there would appear to be no control over the pH of the liquid which is discharged after settling of the iron phosphate takes place. It would also seem that the technique described in the aforementioned patent specification is only effective for the removal of phosphate in the form of iron phosphate.

Acid mine drainage solutions, and similar acidic liquors, generally contain sulphate, often in combination with phosphate. The treatment of this type of effluent poses a problem of many parts in that, ideally, the pH of the effluent should be raised to a substantially neutral level; at least the harmful contaminants such as sulphate and phosphate should be reduced to acceptably low levels; and potentially harmful base metals, which may be dissolved in the effluent, should, preferably, be removed from the effluent as part of a single treatment process.

SUMMARY OF THE INVENTION

The invention provides, in the first instance, a method of treating an effluent which includes the steps of:

(a) introducing the effluent as an electrolyte into an electrolytic reactor which includes at least one sacrificial metallic anode;

(b) dissolving metallic cations from the anode into the effluent;

(b) (i) to increase the pH of the effluent, and (b) (ii) to allow the formation of a metal-contaminant-complex, where the contaminant is selected from phosphate and sulphate; and (c) removing the complex from the effluent.

The method may include the step of precipitating base metals in the effluent as hydroxides (i.e. directly from the reactor.

Preferably the metallic anode is a zinc anode. The invention is however not limited to the use of a zinc anode and any other metal which is capable of increasing the pH of the effluent, and forming a complex of the aforementioned kind, and which is sufficiently inexpensive, may be used in place of zinc.

When use is made of a zinc anode then the complex may be a zinc phosphate or sulphate complex, both of which are insoluble at certain pH values. In the latter case the complex may be a zinc-hydroxyl-sulphate complex.

The complex may be removed from the effluent in any appropriate way but, preferably, is precipitated from the reactor. To this end the pH may be controlled to render the complex insoluble in the effluent.

The method may include the step of treating the complex to recover at least some of the metal therefrom. Thus, in the case where the method makes use of a zinc sacrificial anode, the precipitated zinc complex may be subjected to a zinc recovery process, which may be electrolytic, and the zinc recovered from the process may be recycled and, ultimately, may be available for reuse in the method of the invention.

Base metals may be precipitated from an overflow of effluent from the reactor or, as noted, directly from the reactor.

The invention preferably includes the step of controlling the parameters of the electrical energy input to the reactor to control the pH of the effluent at a value which maximizes the formation of the metal-contaminant complex. Thus the voltage which is applied to the reactor and the electrical current which flows through the effluent (i.e. the electrolyte), and the period of time for which the current is passed, may be regulated to control the quantity of electrical energy or charge introduced into the reactor.

Preferably the pH is raised to a level of from 5 to 7, e.g. from 5.5 to 6.5, to maximize the formation of the said complex. The exact pH value depends on the chemical condition and speciation of the effluent, and the electrochemical characteristics, i.e. the ion content, of the effluent.

For a particular acid mine drainage solution the pH level was in the range of 6 to 7. This pH level effectively promoted the formation of insoluble zinc-hydroxyl-sulphate, which was then precipitated from the solution.

On the other hand insoluble zinc phosphate was formed at a pH level in the range of 2 to 4.

In one form of the invention the electrical energy input to the reactor, expressed as a ratio of coulombs/liter of effluent in the reactor, is in the range of 1000 to 2500. A preferred ratio is approximately 2000.

Further electrical parameters which may be controlled, according to requirement, include the profile or shape of the voltage which is applied to the reactor, the amplitude of the current flow, if the voltage is pulsed the frequency thereof; and the voltage polarity which may be reversed at intervals to reduce unwanted deposits on the electrodes.

If use is made of a plurality of cathodes and anodes then the spacing or interpolar distance between the electrodes may be adjusted, if necessary on an empirical bases, to achieve an effective precipitation of the metal-contaminant complex.

More particularly the pH of the system is controlled by balancing the charge delivery rate to the solution, i.e. coulombs/liter, and the effluent flow rate, i.e. liters/second, which regulates the retention time of the solution in the reactor.

According to a second aspect of the invention there is provided a method of treating an effluent which includes the steps of introducing zinc cations into the effluent in a reactor to increase the pH of the effluent, allowing at least some of the cations to react with hydroxyl ions and sulphate anions in the effluent to form a zinc-hydroxyl-sulphate complex, and precipitating the complex from the effluent to produce an overflow.

The method may include the step of precipitating base metals from the overflow,

In a variation of the invention which holds particular commercial utility there is provided a method of treating an acid mine drainage solution wherein the pH of the solution is increased by dissolving zinc ions into the solution, and the pH of the solution is controlled so that at least some of the zinc ions are allowed to react with sulphate ions in the solution to form an insoluble zinc-hydroxyl-sulphate complex which is then precipitated from the solution.

by balancing the flow rate of the effluent (containing the sulphate) and the electrical energy introduced into the effluent, expressed as coulombs/liter, the pH can be controlled at an optimum value which promotes the formation, and hence precipitation, of insoluble zinc-hydroxyl-sulphate. These aspects are important for they enable the effluent to be treated on a continuous basis, as opposed to a batch basis.

The invention further extends to apparatus for treating an effluent which includes an electrolytic reactor into which the effluent is introduced and in which are located at least one cathode and at least one metallic anode, an electrical energy supply connected to the cathode and the anode, the parameters of the electrical energy supply and the anode being such that metallic cations from the anode are dissolved into the effluent to increase the pH of the effluent and to cause the formation of a metal-contaminant complex, where the contaminant is selected from phosphate or sulphate anions in the effluent, means for separating precipitated complex from the effluent in the reactor, and means for clarifying overflow from the reactor.

The metal phosphate, and hydroxides in the effluent, are insoluble and precipitate at pH values above a lower limit which, depending on conditions, may be in the range of the 2 to 4. On the other hand metal sulphate, in the form of metal-hydroxyl-sulphate, is insoluble only in a narrow pH range, typically from 8 to 7.

The metallic anode may be a zinc anode.

The clarifying means may include means for precipitating base metals from the overflow, or directly from the reactor.

BRIEF DESCRIPTION OF THE DRAWINGS

The invention is further described by way of example with reference to the accompanying drawings in which:

FIG. 4 is a flow diagram representation of a method according to the invention.

DESCRIPTION OF PREFERRED EMBODIMENT

In this specification a solution having electrical conductivity is called an electrolyte. This type of solution, e.g. water, can normally also dissolve solid substances like the salts of inorganic and organic acids as well as other normally non-polar substances such as sugar. In process industries such dissolved substances, residual in the process waste solutions, are called pollutants or contaminants.

The invention is concerned with a method which enables pollutants or contaminants such as sulphate and phosphate to be removed from effluent such as acid mine drainage. The invention is also concerned with increasing the pH of an effluent of this type to a less harmful value and, preferably, to a substantially neutral value.

The principles of the invention are described hereinafter, in general form, with reference to FIG. 1. A specific embodiment of the process of the invention is described hereinafter with particular reference to the flow diagram of FIG. 4.

Figure 1:
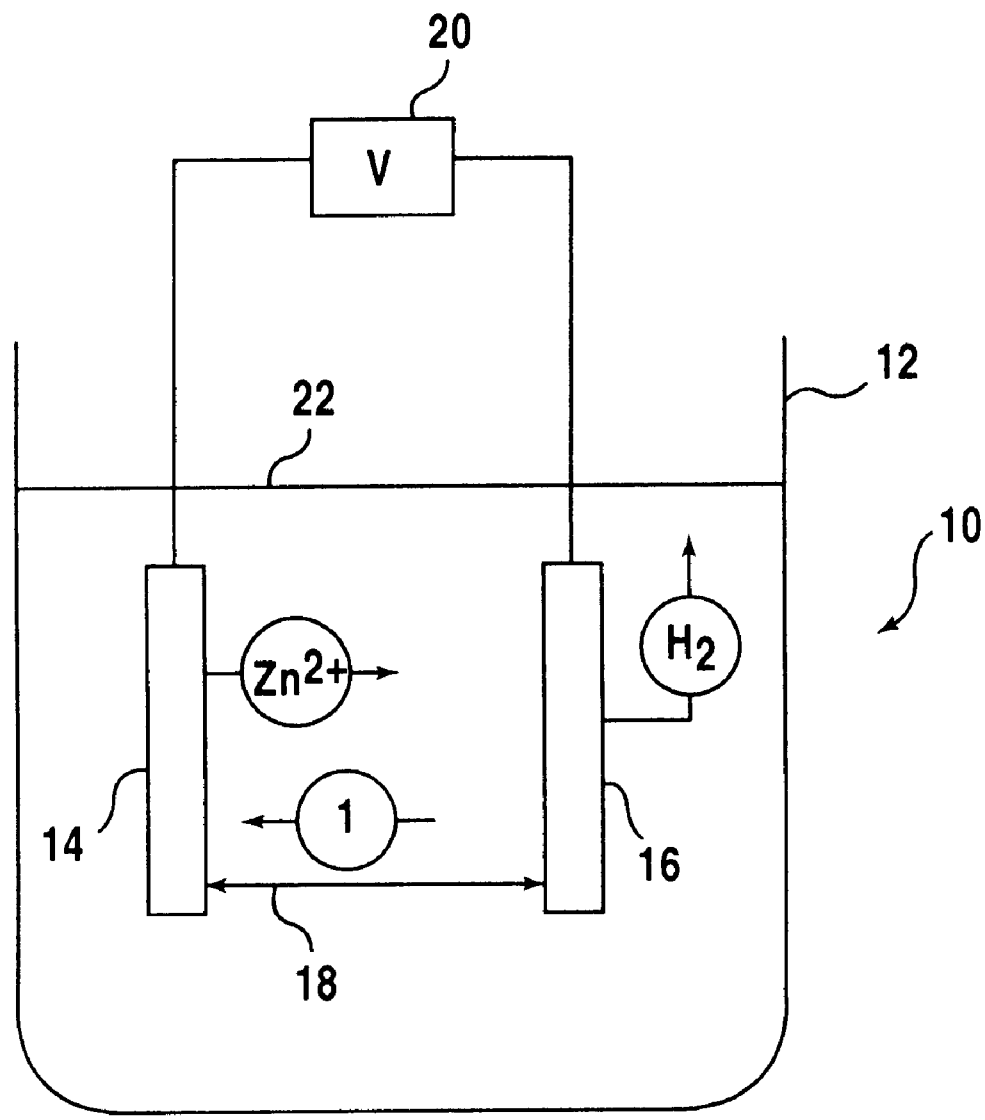
FIG. 1 schematically illustrates an electrolytic reactor or electrochemical cell as used in the method of the invention.

FIG. 1 illustrates an electrolytic reactor 10 which includes a vessel 12 in which are located an anode 14 and a cathode 16. These electrodes are made of zinc and are in the form of flat plates with relatively large effective surface areas. The spacing 18 between opposed surfaces of the anode and the cathode may be varied according to requirement, for purposes which are described hereinafter.

It is to be understood that FIG. 1 illustrates a single anode and a single cathode but that multiple anodes and cathodes may be employed in a reactor which is used in the method of the invention.

A voltage V, at a suitable amplitude, from an electrical source 20, is applied across the anode and the cathode. The voltage may have any suitable wave form and the current delivering characteristic of the source 20 may be controlled using techniques which are known in the art. The wave form of the voltage which is impressed across the electrodes may be pulsed or shaped according to requirement and may, from time to time, be reversed, for reasons which are described hereinafter.

An electrolyte 22 is introduced into the vessel 12.

The application of the voltage to the electrodes causes an electric current I to flow between the electrodes. The current has an anodic reaction with the anode 14 and a cathodic reaction with the cathode 16.

If the electrolyte 22 is pure water, at a neutral acidity (pH=7) then electrons will start flowing from the cathode to the anode when the applied voltage across the electrodes reaches a value of about 0.75 volts.

For electrons to flow the cathodic reaction consists of stripping each of two hydrogen atoms (H), in the electrolyte, of their electrons. This results in the formation of two $H^+$-ions which combine to form one molecule of hydrogen gas ($H_2$) which escapes from the electrolyte.

The system is kept in an electrically balanced state in that one atom of zinc at the anode converts or dissolves to form one dissolved cation of zinc, depicted by $Zn^{2+}$, which now balances the two positive charges (the two $H^+$-ions) lost from the electrolyte via the cathodic reaction. This is typically known as an electrochemical process using sacrificial electrodes.

The net effect of these reactions is that the balance of the positive and negative ions of water in the system is now influenced. There are now more negative ions than positive ions in the system, due to the escape of hydrogen gas.

The balancing $OH^-$ ions are then in excess and this results in an increase in pH according to the definition of pH, i.e. $pH=-\log[H^+]$ or $pOH=-\log[(OH^+]$ where: $pH+pOH=14$ for pure water.

The overall effect is that:

(a) zinc is dissolved into the electrolyte, and (b) the pH of the electrolyte is increased and the electrolyte is thereby rendered less acidic.

Under these conditions it is clear that when the ionic concentrations are low, $Zn^{2+}$ and the hydroxyl ions exist only at certain pH values in the lower pH ranges. At the higher pH values the different ionic species such as the zinc cation and the hydroxyl anion increasingly tend to combine and form an insoluble precipitate of zinc hydroxide. It is possible to promote higher rates of precipitation by increasing the number of electrodes in the reactor. It may be advantageous to exploit various means of coupling the electrodes to one another to achieve safer operation, higher productivity, and a lesser amount of scaling of the electrodes.

If the electrolyte 22 is an effluent containing sulphate or phosphate anions, as contaminants, the same technique, under controlled conditions, can be utilised to remove the contaminants as an insoluble complex. The required conditions exist at the surface of the electrode and, in the case of a zinc anode and a sulphate-containing effluent, give rise to the formation of a pH-sensitive zinc-hydroxyl-sulphate complex which is insoluble in a narrow pH range of from 6 to 7 and which settles as a heavy crystalline precipitate in the reactor 10.

Higher rates of precipitation may be promoted by increasing the electrical current, by increasing the number of electrodes in the reactor and by varying the spacing 18 between each opposing anode and cathode pair, if necessary on an empirical basis.

Figure 2:
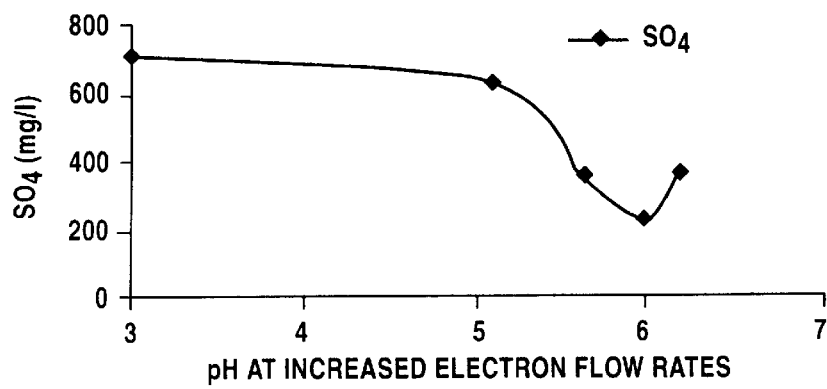
FIG. 2 is a curve which illustrates sulphate content as a function of pH, where the pH was manipulated by varying the flow rate of the solution, on a continuous run.

FIG. 2 is a curve which illustrates sulphate concentration, in milligrams per liter, in an effluent as a function of the pH of the effluent under continuous effluent flow conditions during which the electron flow rate was manipulated to control the pH of the solution. Generally the pH increases as the electron flow rate increases.

Acid mine drainage was introduced in a continuous run into a reactor 10 of the kind shown in FIG. 1 and the voltage across the electrodes was manipulated to control the pH of the solution in the reactor. For a pH range of from about 3 to 5 the sulphate concentration was reduced by about 20% to a level lying between 700 mg/l and 600 mg/l. At a pH of 6 a substantial percentage reduction, of the order of 70%, of the sulphate concentration was achieved.

Figure 3:
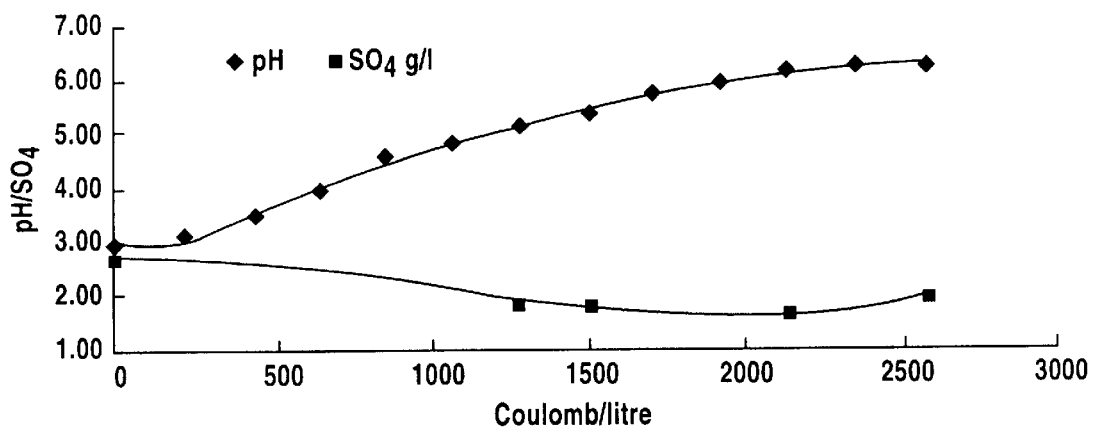
FIG. 3 illustrates pH and sulphate removal relationships, as a function of time, in a batch treatment mode, during treatment of effluent in accordance with the principles of the invention.

FIG. 3 illustrates how the quantity of electrical energy delivered to the electrolyte in a batch reactor, and expressed as a function of charge density in coulombs per liter, increases the pH of the effluent and reduces the sulphate content. It is to be noted that, in a general sense, the pH continues increasing as the coulombs per liter factor increases but that there are diminishing returns, in respect of a reduction in the sulphate concentration, when this factor reaches a figure of about 2000.

The curves of FIG. 3 were obtained from measurements taken on a 150 liter batch of effluent containing sulphate.

The following table reflects an analysis of the effluent, which was acid mine drainage subjected to batch treatment. Measurements were taken before and after treatment and illustrate a substantial reduction of the base metals in the effluent, in the sulphate content and in the acidity of the effluent. It is to be noted that, in respect of the base metal content, only iron, aluminium and calcium were measured.

| Raw untreated | | | | | | Treated supernatant | | | | | |
|---|---|---|---|---|---|---|---|---|---|---|---|
| pH | SO$_4$ | Fe | Al | Zn | Ca | pH | SO$_4$ | Fe | Al | Zn | Ca |
| 3.0 | 600.0 | 26.0 | 35.0 | | 30.0 | | | | | | |
| 2.5 | 686.0 | 54.0 | 45.4 | | 29.6 | | | | | | |
| 3.2 | 465.0 | 20.0 | 44.3 | 96.5 | 20.0 | 5.4 | 348.0 | 1.4 | 44.3 | 116.0 | |
| 2.5 | N/V | 45.0 | 50.0 | 104.0 | | | | | | | |
| | | | | | | 5.9 | 550.0 | N/V | N/V | N/V | |
| | | | | | | 5.8 | 540.0 | 1.2 | 0.2 | N/V | |
| 2.6 | 595.0 | 26.4 | 58.3 | N/V | 26.8 | 5.6 | 540.0 | 0.1 | 0.1 | 310.0 | 25.5 |
| 2.5 | N/V | 45.0 | 50.0 | 104.0 | | | | | | | |
| 2.6 | 625.0 | 23.8 | N/V | N/V | 21.0 | 4.7 | 589.0 | 1.8 | 0.0 | 284.0 | 23.0 |
| 3.1 | 750.0 | 1.3 | | 78.0 | 42.0 | 5.5 | 540.0 | 1.0 | | 370.0 | 40.0 |
| 2.5 | 660.0 | 0.8 | | 65.0 | | 6.3 | 500.0 | 0.0 | | 327.0 | |
| 2.9 | 609.0 | 12.9 | 25.0 | | 18.5 | 6.9 | 443.0 | 0.0 | 0.1 | | 18.5 |
| 2.9 | 539.0 | 0.0 | 53.0 | N/V | 27.0 | 6.3 | 419.0 | 0.0 | 0.0 | N/V | 35.0 |
| 3.0 | 653.0 | 22.7 | 30.5 | | 25.8 | 6.2 | 540.0 | 0.0 | 0.1 | | 25.8 |
| 2.9 | 658.0 | 23.5 | 31.0 | | 26.0 | 5.4 | 584.0 | 0.0 | 0.1 | | 24.0 |
| 3.0 | 737.0 | 17.0 | 30.0 | | 84.0 | 5.7 | 659.0 | 0.0 | 0.1 | | 88.0 |

(N/V - not available)

FIG. 4 is a process flow diagram of a particular example of the invention used for the continuous treatment of acid mine drainage to remove sulphate therefrom and to increase the pH of the recovered water.

A reactor 10 which includes a vessel 12 has mounted in it a bank of zinc anodes 14 and a bank of zinc cathodes 16. An electrical supply 20 is connected to the anodes and the cathodes. The parameters of the electrical supply are controlled by means of a control device 24. The device may be of a kind which is known in the art and hence is not further described herein. The function of the device is to control the voltage which is applied across the anode/cathode pairs and the current which flows between each anode and cathode pair. The voltage may be controlled in wave form and in amplitude. The voltage if necessary may be pulsed and from time to time the polarity of the voltage which is applied to the anodes and cathodes may be reversed. This so-called passivation technique helps to prevent the build-up of unwanted deposits on the electrodes.

Acid mine drainage 26 is continuously introduced into the vessel 12 and overflow 28 from the vessel passes to a clarifier 30 and a precipitation stage 32.

Material which is precipitated from the vessel 12 is directed to a process flow path 34.

The quantity of electrical energy, in the form of charge or coulombs, required to be input to the reactor 10, is determined by Faraday'law which can be formulated as follows:

W=VIT/Z MF where:
    W is the mass of metal, i.e. zinc from the anode, to be dissolved into the electrolyte in the vessel 12;
    V is the voltage across the electrodes;
    I is the electrical current flowing through the electrolyte;
    T is the time in seconds for which the current I is passed;
    Z is the valency of the metal (in this case zinc) to be dissolved into the electrolyte;
    M is the atomic mass of the dissolved metal; and
    F is Faraday's proportionality constant.

As explained hereinbefore with reference to FIG. 1 the electrical current which flows between the electrodes anodically dissolves the zinc anodes and a reaction takes place which produces a precipitate and an overflow 28 to the clarifier 30. At the same time the pH of the solution in the vessel 12 is increased. The pH is increased under controlled conditions taking into account the following factors: the amount, and hence the cost, of electrical energy required to achieve a satisfactory pH level; the efficiency of the formation of the zinc-hydroxyl-sulphate complex, or zinc-phosphate complex, as the case may be, in an efficient manner which, as noted, is pH dependent, and the acceptable pH level of liquid ultimately discharged to waste, and output from the apparatus shown in FIG. 4.

The precipitate 36 in the underflow from the vessel 12 is the zinc-sulphate (or phosphate) complex referred to hereinbefore. In general terms, for sulphate, the complex has a formula $(Zn)_x (OH)_y (SO_4)_z$, wherein x=4, y=6, and z=1. However, it is possible that other combinations of x, y, and z may exist in the precipitate 36. The precipitated zinc complex 36 is directed to a zinc electrowinning process 38 to recover zinc metal. The zinc which is recovered may ultimately be reformed into electrode plates and recycled, as is indicated schematically in a block 40, for eventual reuse in the reactor 10.

The overflow 28 from the reactor passes through flow control and pH control systems 42 to the clarifier 30. Here the overflow is split into two streams. The first stream is a final water product 44 which is discharged as waste. The water 44 has an acceptable pH level which is neutral or substantially neutral and a significantly reduced sulphate and phosphate content.

The second stream produced by the clarifier 30 is an underflow of precipitated base metals 46 which are mainly hydroxides. The bulk of the underflow would normally be discarded as solid waste sludge on suitable sites but it is possible with correctly designed separation equipment 48 to recover at last some of the base metals for sale.

It is also possible to precipitate base metals (step 50) directly from the reactor, as is indicated by a dotted line, or to separate precipitated base metals from the zinc complex using any suitable technique e.g. a gravity separation process.

It is to be noted that the wave form of the electrical source applied to the electrodes is important for it significantly influence the effective precipitation of the zinc-hydroxyl-sulphate complex. The geometry of the electrodes in the reactor, and the spacing or interpolar distance between each anode and opposing cathode, are also important. These parameters are generally determined empirically and are adjusted on site taking into account the geometry of the vessel 12, and the speciation and nature of the electrolyte or effluent which is being treated.

X-ray diffraction analysis has shown that the final product i.e. the precipitated zinc complex 36, from the reactor 10, has a formula of $(Zn)_4 (OH)_6 (SO_4)$.

As the phosphate and sulphate precipitate at different pH values it is possible to collect these precipitates separately. The pH in a single reactor can either be held in a first range, and then in a second range, or the effluent can be passed to a first reactor which holds the pH in a first range, and then to a second reactor which holds the pH in a second range with each pH range causing precipitation of a phosphate or sulphate complex, as described. The first approach is better suited to batch processing while the second approach lends itself to continuous processing.

What is claimed is:

1. A method of continuous flow treatment of an effluent containing phosphate and sulfate contaminants which comprises the steps of:

(a) continuously introducing, at a flow rate, the effluent as an electrolyte into an electrolyte reactor which comprises at least one sacrificial zinc anode and at least one cathode;

(b) dissolving metallic cations at a controlled rate from the anode into the effluent by applying an electric energy to said anode and cathode to create a current flow between said anode and cathode;

(b)(i) to increase the pH of the effluent in said reactor, and (b)(ii) to allow the formation of an insoluble zinc contaminant complex;

(c) balancing said flow rate of the effluent and said electrical energy at a ratio of from 1000 to 2500 coulombs/liter of effluent to control said pH at a level of from 2 to 7 in order to maximize and to promote the formation of the zinc contaminant complex; and (d) removing the zinc contaminant complex from the effluent.

2. A method according to claim 1, wherein the zinc contaminant complex is precipitated in said reactor.

3. A method according to claim 1, wherein a plurality of anodes and cathodes are used in said reactor.

4. A method according to claim 1, wherein voltage polarity between said anode and cathode is reversed from time to time.

\* \* \* \* \*